US007218493B2

(12) United States Patent
Colombo et al.

(10) Patent No.: US 7,218,493 B2

(45) Date of Patent: May 15, 2007

(54) CIRCUIT BREAKERS WITH INTEGRATED CURRENT AND/OR VOLTAGE SENSORS

(75) Inventors: Alessandro Colombo, Milan (IT); Carlo Gemme, Pavia (IT); Christian Reuber, Ratingen (DE); Pentti Mahonen, Wasa (FI)

(73) Assignee: ABB Technology AG (CH)

( * ) Notice: Subject to any disclaimer, the term of this patent is extended or adjusted under 35 U.S.C. 154(b) by 174 days.

(21) Appl. No.: 10/500,365

(22) PCT Filed: Dec. 27, 2002

(86) PCT No.: PCT/EP02/14887

§ 371 (c)(1),
(2), (4) Date: Jun. 28, 2004

(87) PCT Pub. No.: WO03/056594

PCT Pub. Date: Jul. 10, 2003

(65) Prior Publication Data

US 2005/0013077 A1 Jan. 20, 2005

(30) Foreign Application Priority Data

Dec. 28, 2001 (EP) ................................. 01205245

(51) Int. Cl.
*H02H 3/00* (2006.01)

(52) U.S. Cl. ........................................................ 361/65

(58) Field of Classification Search ............. 335/6–10, 335/17; 361/7, 30, 65, 66, 79, 88–102
See application file for complete search history.

(56) References Cited

U.S. PATENT DOCUMENTS

| | | | | |
|---|---|---|---|---|
| 4,281,359 | A | 7/1981 | Bayer et al. | |
| 5,448,173 | A * | 9/1995 | Shinohara et al. | 324/464 |
| 6,844,799 | B2 * | 1/2005 | Attarian et al. | 335/18 |

FOREIGN PATENT DOCUMENTS

| | | | |
|---|---|---|---|
| WO | WO 95 27297 | A | 10/1995 |
| WO | WO-97/08725 | | 3/1997 |
| WO | WO-99 36928 | A | 7/1999 |
| WO | WO-01/57979 | A1 | 8/2001 |
| WO | WO-01/78099 | A1 | 10/2001 |

* cited by examiner

*Primary Examiner*—Ramon M. Barrera
(74) *Attorney, Agent, or Firm*—Connolly Bove Lodge & Hutz LLP

(57) ABSTRACT

A circuit breaker (100), in particular a medium voltage circuit breaker, having a current (20) and/or a voltage measuring device (30) integrated thereon. The integration can be functional and/or physical. The functionally integrated current and/or voltage measuring device provides primary current and voltage representative signals to an on-board electronic device (50) in order to realize the measure, process, and protection functions as a whole.

10 Claims, 5 Drawing Sheets

CIRCUIT BREAKERS WITH INTEGRATED CURRENT AND/OR VOLTAGE SENSORS

CROSS REFERENCE TO RELATED APPLICATIONS

This application is a U.S. National Stage entry of co-pending International Patent Application No. PCT/EP02/14887, filed Dec. 27, 2002 by Colombo, Alessandro et al entitled CIRCUIT BREAKERS WITH INTEGRATED CURRENT AND/OR VOLTAGE SENSORS, the entire contents of which is incorporated by reference, and for which priority is claimed under U.S.C. § 371. As in the parent International Application No. PCT/EP02/14887, priority is also claimed to co-pending European Patent Application No. 01205245.2, filed Dec. 28, 2001, the entire contents of which is incorporated by reference for which priority is claimed under 35 U.S.C. § 119.

The present invention relates to an electric circuit breaker, in particular a Medium Voltage circuit breaker having at least a current and/or voltage sensor integrated thereon.

The actual solution in primary distribution switchgear for voltage and current measure is well known and is reported with the single line diagram in FIG. 1. According to conventional set-up, current measure is performed in each panel, in particular for protection requirements, by means of a current transformer or current sensor. Voltage measure is an optional feature, integrated in the bay panel when required by means of voltage transformer or voltage sensors. It is usually required mainly for busbar voltage measure on both sides of the CB and/or in incoming feeders.

Whatever the technology used for the current and voltage measure the needed devices are installed in the panel and the signal representative of the primary current and/or voltage is wired to the protection/control device to implement the necessary protection, control and metering functions. FIG. 2 gives an example of a conventional set-up.

Different solutions, in particular for secondary distribution, with the integration of the current sensor on-board the circuit breaker, are available on the market. In these products the current transformers, or in general the current sensors, are made as an object physically mounted on the contact arm of the circuit breaker and a sort of functional integration is achieved.

However, a customization of the current and voltage measure devices is required, depending on the specific installation features and depending on the number and typology of protection/control devices. This makes the engineering of a switchboard particularly lengthy and difficult.

In particular the following features and parameters need to be specified:

type and number of measuring devices, their ratings (rated current, rated voltage, insulation level, etc.)

number, rated value, rated power, accuracy of the outputs, panel and interpanel cabling to bring the measure output to all the protection/control devices.

The location of the measuring devices within the panel needs also to be taken into account. Although the location is usually predefined with typical configurations, it may be necessary to study it for a specific installation if the number and characteristic of the measuring devices are particular.

The invention aims at the physical and functional integration of current and/or voltage sensor on-board the circuit breaker, both for fixed and withdrawable executions.

Such solution enables to reach a high integration with the on-board electronic device, thereby reducing engineering and customization effort.

The circuit breaker of the present invention are characterized by a functional and physical integration of at least a current and/or voltage sensor.

The functional integration of current and/or voltage sensor is done on-board the circuit breaker where an Electronic Device (ED) acquires the measures and process the information. As shown in details in FIG. 3, the whole function measure, processing, protection decision, control of primary equipment and primary power switching is realized as a whole by three functional blocks, namely the measure device block, the Electronic Device block and the Circuit Breaker block.

By being realized as a whole the system can be optimized, realizing a unique hardware solution, so that all the required customization to adapt to specific installations is performed by software configuration of the Electronic Device.

Such step enables to implement the desired functionality independently from the physical integration.

The physical integration of current and/or voltage sensors into the CB can be achieved, for example, by integration of the current and/or voltage sensor on the connecting arms of the circuit breaker or in the casting of the circuit breaker pole.

Such physical integration enables to maintain physical dimensions comparable to existing switch, so to be exchangeable in existing installation for retrofitting purposes. Furthermore the wiring to the ED is reduced to a minimum due to compactness, enabling better signal/noise and lower EMI problems. In addition, the physical integration enable a cost reduction of the whole.

The circuit breakers according to the present invention have several advantages. From a functional standpoint, the hardware of the whole system, i.e. measurement, electronic device, and circuit breaker, is predefined and no hardware customization is needed.

Also, the hardware of the measure sensors is the same to cover all the expected current and voltage range. No specification of ratings is required, thereby simplifying the specification, engineering and purchase process.

In addition to that, the current and/or voltage representative signals are acquired by the electronic device and used for all the expected protection and control functions, with no requirement for additional or special measuring devices.

From a physical standpoint, due to integration on-board the CB, the dimensions are smaller and cable length is reduced. Furthermore cable length and disposition is always the same and can be pre-enginerized. It is also possible to have only one casting for both components.

Figure 1:
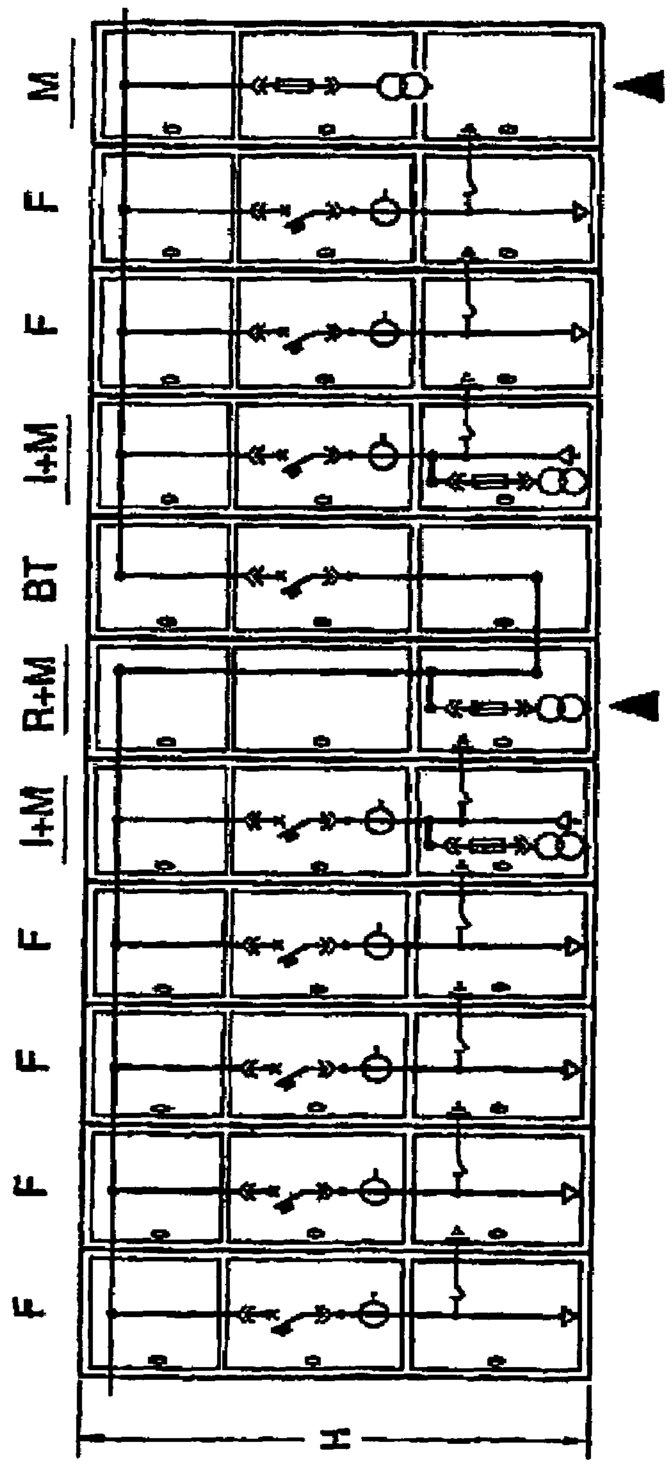
Figure 1 BACKGROUND ART
FIG. 1 shows an example of a background art set-up of primary distribution switchgear for voltage and current measurement.
Figure 2:
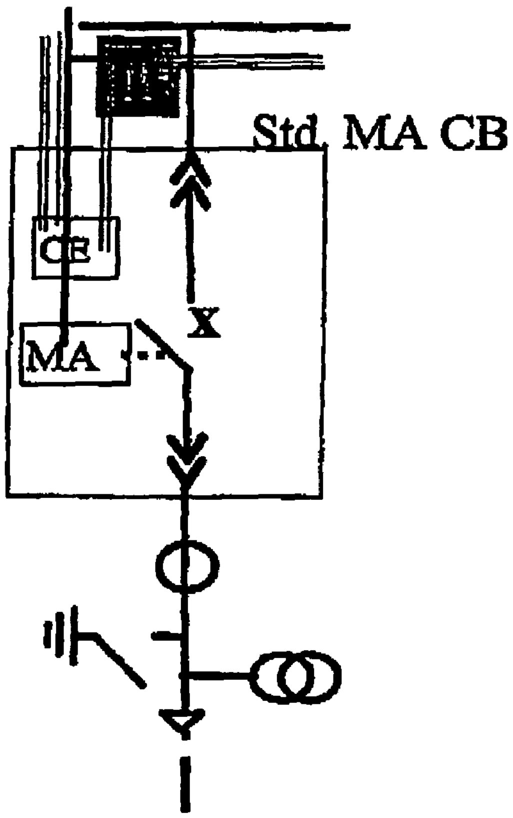
Figure 2 BACKGROUND ART
FIG. 2 shows another example of a background art set-up for voltage and current measure.
Figure 3:
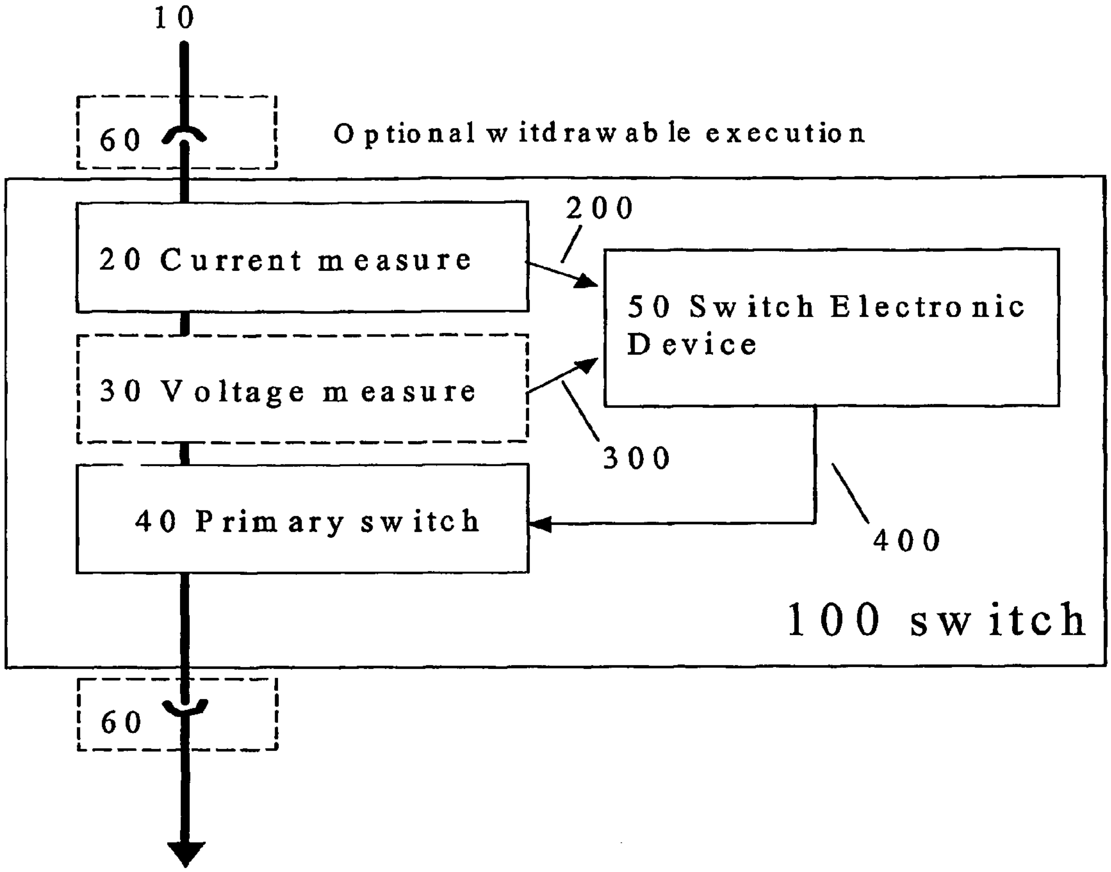
FIG. 3 is a functional block diagram of an exemplary embodiment of a circuit breaker.

Referring to FIG. 3, the characteristics of the circuit breaker of the invention are described in details.

An integrated switch 100, protects and/or operates a power line 10 by means of the power primary switch 40. The switch, which can optionally be realized in withdrawable execution 60, is characterized by the integration of the current 20 and/or voltage 30 measure devices within the functional unit of the switch itself 100.

Such current and voltage measuring devices provide the on-board switch Electronic Device Unit 50 with the primary current and voltage representative signals, 300 and 200. The Electronic Device Unit 50 acquires and processes those signals in order to perform protection, control, measure, interlocking, safety and others functions at local level, by issuing control and operation commands 400 to the primary switch 40. Alternatively, the required information can also be forwarded to other intelligent control and protection units.

By the physical and functional integration of the voltage and current sensors on-board the measure—processing—protection function chain is integrated in a single functional unit. In this way all the interfaces between the originally separated functional blocks, i.e. the block 20-30 and block 50, become an internal interface in a predefined, pre-industralised object. In such way such interfaces can be optimized in terms of type of signal and physical connection, enabling the needed customization to fulfill the customer requirements to be satisfied by software settings instead of hardware customization.

To enable the functional integration of the measure devices on-board the switch, the Rogowsky coil 21 solution is preferred, as it enables to realize a smaller current sensor when compared to a traditional iron core instrument transformer. In alternative other current sensing techniques can be used, as the realization of an array of Hall current sensors 22.

Figure 4:
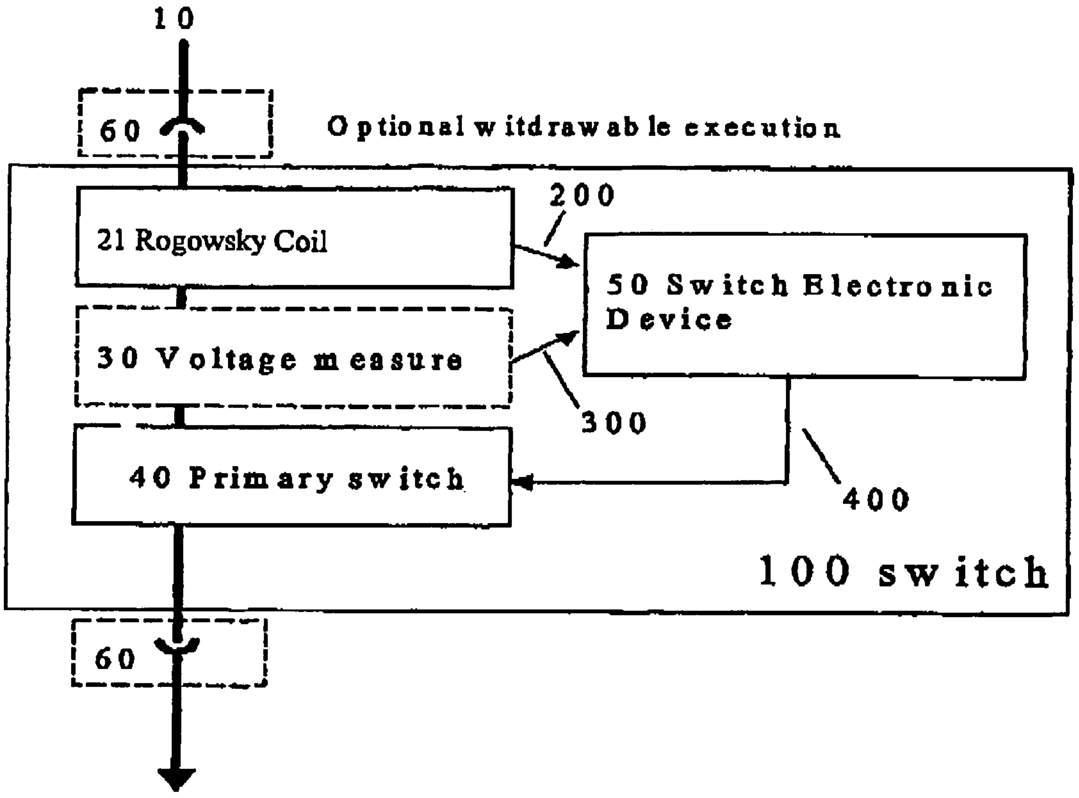
FIG. 4 is an alternate embodiment of the invention where the current measuring device is in the form of a Rogowsky coil.
Figure 5:
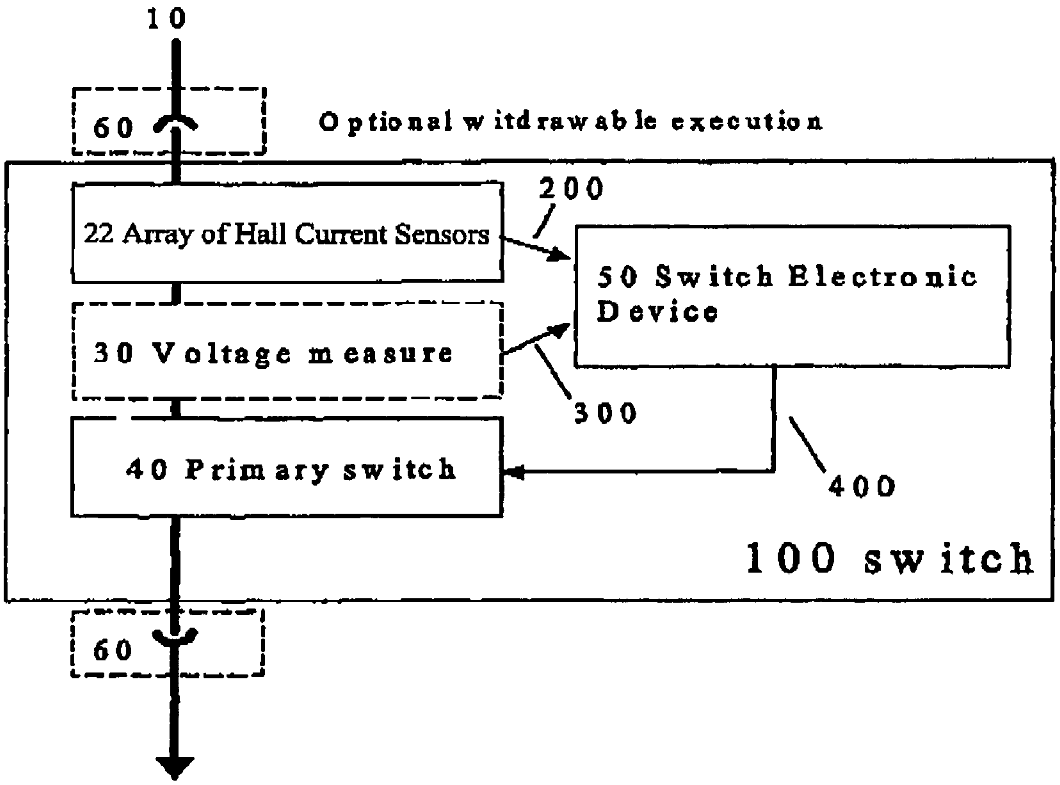
FIG. 5 is yet another alternative embodiment of the device where the current measuring device is in the form of an array of Hall current sensors 22.

FIG. 4 is an alternate embodiment of the invention where the current measuring device is in the form of a Rogowsky coil, 21. FIG. 5 is yet another alternative embodiment of the device where the current measuring device is in the form of an array of Hall current sensors 22.

Such current measuring techniques are preferred for the physical integration of the measuring device within the switch. Since they are very compact they enable solutions of integration of the current sensor within functional parts of the switch itself, such as, for example, the pole, by introducing the current measuring device as an insert in the pole casting. Alternatively a similar physical integration in the switch is obtainable by the integration of the measuring device within the contact arm, used to connect the switch itself to the distribution system. In such case the measuring device can be integrated on the contact arm for example by casting it on the arm or by using an insulating sleeve.

For the physical integration within the switch of the voltage measuring device the solution of using the current measuring device itself as a floating potential electrode is preferred. In such way it is possible to couple to the primary voltage and to provide a signal representative of the same. The voltage signal provided by the realization of an adequate capacitive divider is matched by the Electronic Device dedicated inputs.

By the functional integration of the measuring devices on-board the switch it is possible to optimize the Electronic Device inputs so to match the characteristics of the signals in their expected range, as amplitude, dynamic, time constant, frequency, and so on.

Such integration furthermore enables to use the same physical measuring device for all the primary quantities, i.e. current and voltage, range and to realize the customization to the specific installation by a sofware configuration of the Electronic Device only.

The invention claimed is:

1. A switch comprising:

a primary switching device operating on a power line; and an electronic device unit that acquires from at least one of a current measuring device and a voltage measuring device signals indicative of primary current and primary voltage values of said power line and that sends control and operation commands to said primary switching device, wherein said current and voltage measuring devices are integrated within said switch so that said voltage measuring device performs a measurement of said primary voltage through a capacitive coupling arrangement comprising said current measuring device, and wherein said capacitive coupling arrangement uses said current measuring device as a floating potential electrode.

2. The switch of claim 1, wherein the physical integration of said current and/or voltage measuring devices is realized through the integration of said current and voltage measuring devices in a pole of said switch.

3. The switch of claim 1, wherein the physical integration of current and/or voltage measuring device is realized through the integration of said devices on the pole contact arm.

4. The switch according to claim 1, wherein said current measuring device comprises a capacitor divider.

5. The switch according to claim 1, wherein said current measuring device comprises a Rogowsky coil.

6. The switch according to claim 2, wherein said current measuring device comprises a Rogowsky coil.

7. The switch according to claim 3, wherein said current measuring device comprises a Rogowsky coil.

8. The switch according to claim 1, wherein said current measuring device comprises an array of Hall effect current sensors.

9. The switch according to claim 2, wherein said current measuring device comprises an array of Hall effect current sensors.

10. The switch according to claim 3, wherein said current measuring device comprises an array of Hall effect current sensors.

* * * * *